United States Patent
Pagliarini et al.

(10) Patent No.: US 9,186,856 B2
(45) Date of Patent: Nov. 17, 2015

(54) CIRCUIT FOR EXHAUSTING AIR FROM A PARISON, SYSTEM FOR SUPPLYING AND EXHAUSTING AIR FROM A PARISON AND ASEPTIC MOULDING PROCESS USING SAID CIRCUIT AND SAID SYSTEM

(75) Inventors: Paolo Pagliarini, Parma (IT); Massimo Boselli, Parma (IT)

(73) Assignee: GEA PROCOMAC S.P.A., Sala Baganza (IT)

( * ) Notice: Subject to any disclaimer, the term of this patent is extended or adjusted under 35 U.S.C. 154(b) by 72 days.

(21) Appl. No.: 14/116,537

(22) PCT Filed: May 8, 2012

(86) PCT No.: PCT/IB2012/052286
§ 371 (c)(1),
(2), (4) Date: Nov. 8, 2013

(87) PCT Pub. No.: WO2012/153268
PCT Pub. Date: Nov. 15, 2012

(65) Prior Publication Data
US 2014/0103584 A1    Apr. 17, 2014

(30) Foreign Application Priority Data
May 10, 2011  (IT) .............................. PR2011A0036

(51) Int. Cl.
*B29D 22/00*    (2006.01)
*B29C 49/46*    (2006.01)
*B29C 49/04*    (2006.01)

(52) U.S. Cl.
CPC .............. *B29D 22/003* (2013.01); *B29C 49/46* (2013.01); *B29C 49/04* (2013.01); *B29C 2049/4635* (2013.01); *B29C 2049/4697* (2013.01)

(58) Field of Classification Search
None
See application file for complete search history.

(56) References Cited

U.S. PATENT DOCUMENTS

| | | | |
|---|---|---|---|
| 4,208,852 A | 6/1980 | Pioch | |
| 2008/0128958 A1 | 6/2008 | Litzenberg et al. | |
| 2010/0015269 A1 | 1/2010 | Matsushita et al. | |

FOREIGN PATENT DOCUMENTS

| | | |
|---|---|---|
| DE | 31 11 925 A1 | 10/1982 |
| EP | 2 116 353 A1 | 11/2009 |
| EP | 2 412 513 A1 | 2/2012 |
| JP | 63 221027 A | 9/1988 |
| JP | 8 267558 A | 10/1996 |
| WO | 2011/030183 A1 | 3/2011 |
| WO | 2011/042184 A2 | 4/2011 |

*Primary Examiner* — Monica Huson
(74) *Attorney, Agent, or Firm* — Pearne & Gordon LLP

(57) ABSTRACT

Process of molding a container in a contamination-controlled environment (102) starting from a parison (20) made of plastic material, comprising the steps of: injecting air into the parison (20) at the maximum pressure of 16 bar and subsequently, at the maximum pressure of 40 bar in such a way as to obtain the container; discharging the air from the parison or from the container (20) externally of the contamination-controlled environment (102) until the air pressure inside the container (20) reaches a predetermined value comprised between 0.5 bar and 3 bar; completing the discharge of the air from the container (20) towards the contamination-controlled environment (102).

5 Claims, 3 Drawing Sheets

CIRCUIT FOR EXHAUSTING AIR FROM A PARISON, SYSTEM FOR SUPPLYING AND EXHAUSTING AIR FROM A PARISON AND ASEPTIC MOULDING PROCESS USING SAID CIRCUIT AND SAID SYSTEM

TECHNICAL FIELD AND BACKGROUND ART

The present invention relates to a circuit for exhausting air from a parison, a system for supplying and exhausting air from a parison and an aseptic moulding process using said circuit and said system. In particular, the invention has application in the field of moulding containers made of plastic material, such as PET bottles, under aseptic conditions.

For the sake of clarity, the stretch-blowing process for moulding containers made of plastic material starting from heated parisons is briefly summarised below.

The heated parisons are made to advance towards a rotating carousel having a plurality of moulding stations. In each station there is present a mould consisting of two half-moulds which reproduce the shape of the sides of the container to be obtained. At one of the bases of the mould there is an element for shaping the bottom of the container, known in the art as "mould bottom", which engages with the half-moulds to define a moulding cavity. Once the parison has been laterally clamped, the half-moulds are locked in a closed position by mechanical systems. Present at every mould there is also a closure element, called "seal", having the task of hermetically sealing the mouth of the parison on the neck thereof and of delivering pressurised air into the parison itself.

In the initial phase of the moulding process, the seal delivers air into the parison at medium pressure (maximum of about 15 bar). While air is being delivered at medium pressure, a stretching rod is progressively inserted into the parison, until reaching the bottom of the same. After touching the bottom, the stretching rod continues its linear stroke in order to stretch the parison until the latter reaches approximately the length of the container to be obtained.

Subsequently, the seal blows air into the parison at high pressure (maximum of about 40 bar) so as to expand it until it adheres to the inner walls of the half-moulds and of the mould bottom. Simultaneously, the stretching rod retracts until it is outside the container. The air inside the container is maintained at a high pressure for a few moments so as to consolidate the moulding thereof.

The air inside the container is subsequently discharged, again through the seal. At the end of the process of emptying out the air, the seal is moved away from the container. The locking systems disengage from the two half-moulds, which can then be opened, enabling removal of the mould bottom and subsequent extraction of the moulded container.

An important part of the moulding apparatus is the circuit supplying air to be blown into the parison, which circuit is described below.

Situated downstream of the compressor which supplies air at a high pressure (up to about 40 bar) there are filtering means comprising at least a coalescing filter for eliminating aerosols of water and oil and solid particles, and an activated carbon filter for eliminating odours and oil and hydrocarbon vapours. Downstream of the filters, the supply line forks into a medium pressure circuit (maximum of about 15 bar) and a high pressure circuit (maximum of about 40 bar). Aseptic technology further requires the use of HEPA (acronym of "High Efficiency Particulate Air") filters to remove particles of a size exceeding 0.2 µm from the air.

The air at medium pressure and the air at high pressure are delivered to the individual moulding stations by means of a distribution system comprising tubing and a rotating manifold. At each moulding station, near the seal, the presence of a valve assembly is essential in order to:

establish selective communication between the pathway of the air under medium pressure and the parison placed in the closed mould;

establish selective communication between the pathway of the air under high pressure and the parison placed in the closed mould;

enable air to be discharged from the moulded container externally of the mould, passing through a damper.

However, the apparatus and systems described thus far pose a number of problems in the case of use under aseptic conditions.

As is well known, aseptic moulding takes place in an environment that is washable, sterilizable and kept under microbiological contamination control. It is thus fundamental to ensure a correct filtering of the gaseous fluids to be introduced into the controlled environment, correct management of the pressures in the different areas so as to control the path of any unwanted particles, correct monitoring of the environment, and a correct management and adequate quality of the C.I.P. (acronym of "Cleaning In Place") cleaning and S.I.P. (acronym of "Sterilization In Place") sterilization cycles.

To this end, the Applicant has recently developed an aseptic moulding apparatus in which the rotating moulding carousel is protected by an isolator suitable for defining a contamination-controlled environment, whereas the driving means of the carousel and mould are located outside said isolator. For the purpose of adapting to aseptic technology, "ad hoc" solutions have been conceived for the seal and the stretching rod (European patent application no. 10425259, PCT patent application published as WO2011/030183).

However, the problem of obtaining a complete sterilization of the circuit supplying air to be blown into the parison has remained unsolved to date. In fact, while the HEPA filters, tubing and rotating manifold are easily sterilizable, that is not the case with the valve assembly.

In order to prevent the sterilized moving parts of the valves from coming periodically into contact with non-sterilized surfaces, thereby becoming vehicles of contamination, valves have already been developed which are provided with a membrane capable of isolating the supply circuit from the drive circuit (see, for example, document WO2011/042184).

However, there still remains the problem of isolating the line for exhausting air from the parison towards the outside environment. During blowing, this exhaust line would be exposed to contamination originating from the outside environment, and should thus remain closed.

On the other hand, safety and accident prevention regulations require that a compressed air circuit be completely emptied and maintained empty both during maintenance operations and during emergency shutdowns. Therefore, the discharge valve should be normally open. In this context, the technical task at the basis of the present invention is to propose a circuit for exhausting air from a parison, a system for supplying and exhausting air from a parison and an aseptic moulding process using said circuit and said system, which overcome the above-mentioned drawbacks of the prior art.

DESCRIPTION OF THE INVENTION

In particular, the object of the present invention is to propose an air exhaust circuit that can be sterilized so as to meet the requirements of aseptic technology and, at the same time, complies with safety and accident prevention regulations for compressed air systems.

The stated technical task and specified objects are substantially achieved by a circuit for exhausting air from a parison, a system for supplying and exhausting air from a parison and an aseptic moulding process using said circuit and said system, comprising the technical features disclosed in one or more of the appended claims.

BRIEF DESCRIPTION OF THE DRAWINGS

Additional features and advantages of the present invention of the invention will be more apparent from the approximate, and hence non-restrictive description of a preferred but non-exclusive embodiment of a circuit for exhausting air from a parison, a system for supplying and exhausting air from a parison and an aseptic moulding process using said circuit and said system, as illustrated in the appended drawings in which.

PREFERRED EMBODIMENT OF THE INVENTION

The air exhaust circuit proposed here has application in an apparatus 100 for aseptic moulding of containers starting from parisons made of plastic material as a means of evacuating blown air present in the parison or in the moulded container 20.

Figure 3:
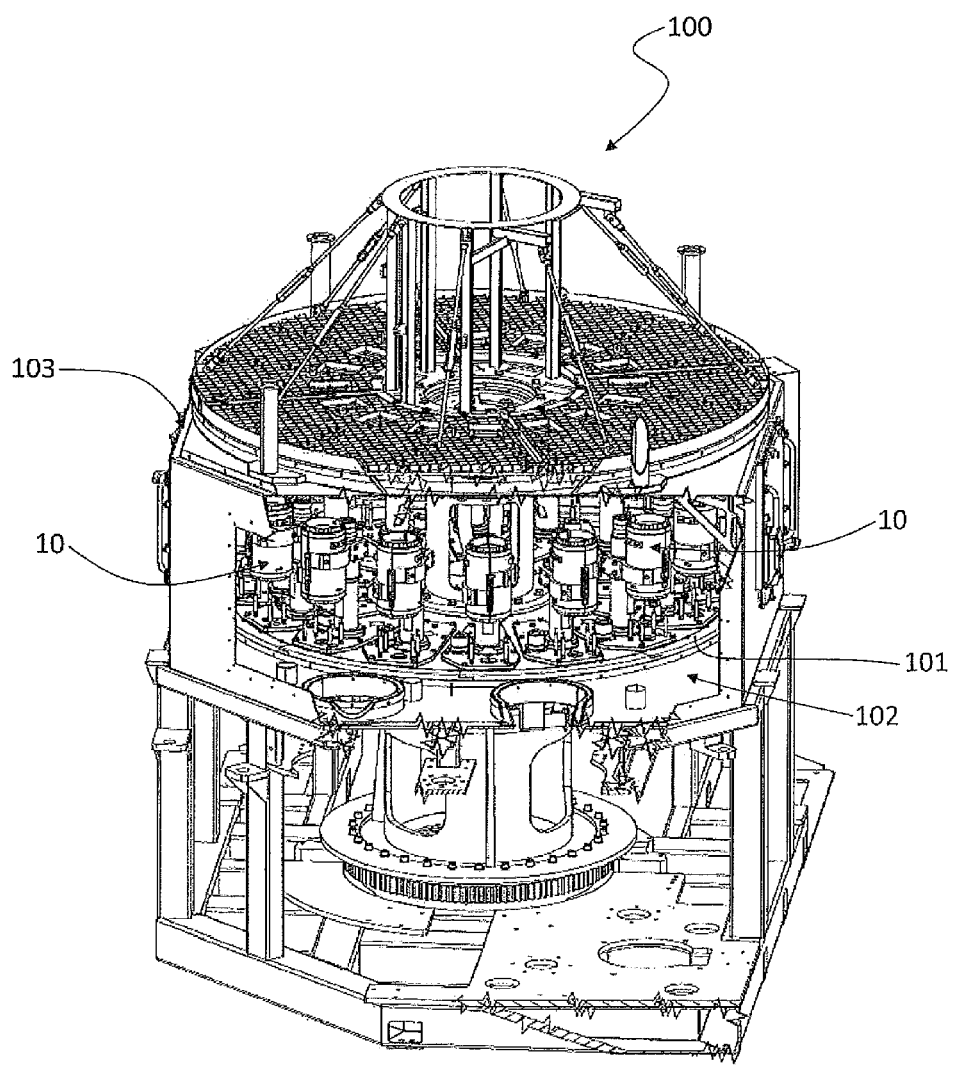
FIG. 3 illustrates a cutaway view of an aseptic moulding apparatus using the air exhaust circuit and supply system of FIG. 1.

For example, the aseptic moulding apparatus 100 comprises a rotating carousel 101, on which there is arranged a plurality of moulds 10 (see FIG. 3). Said rotating carousel 101 is situated inside a contamination-controlled environment 102 protected by an isolation device 103. The driving means of the rotating carousel 101 and moulds 10 are situated outside the isolation device 103, i.e. in a non-sterile environment.

A first aseptic valve 2a is configured so as to establish a selective communication between the inside of the parison or the moulded container 20 and an exhaust line 6 external of said contamination-controlled environment 102. Connected to the external exhaust line 6 there is a damper 9 which dampens the shock wave created by the air under pressure. In particular, the damper 9 is situated in a "dirty", i.e. non-sterile zone.

A second aseptic valve 2b is configured so as to establish a selective communication between the inside of the parison or the moulded container 20 and the contamination-controlled environment 102.

The first and second valve 2a, 2b are controlled by piloting means 3a, 3b configured so that the discharge of the air present in the parison or in the moulded container 20 occurs, respectively, towards the contamination-controlled environment 102 through the second valve 2b while the air pressure in the parison or in the moulded container 20 is maintained below a predetermined value, and externally of the contamination-controlled environment 102 through the first valve 2a while the air pressure is maintained above said predetermined value.

In other words, the opening and closing of the first valve 2a and of the second valve 2b take place in an alternating manner so that air is discharged through one or the other of said valves 2a, 2b.

In particular, the first valve 2a is normally closed and receives, during a first exhaust step, an opening command C1 from the piloting means 3a in response to detection of an air pressure in the parison or in the moulded container 20 which is greater than the predetermined value.

The second valve 3b, in contrast, is normally open and receives a closing command C2 from the piloting means 3b in response to detection of an air pressure in the parison or in the moulded container 20 which is above the predetermined value.

Preferably, the predetermined value is comprised between 0.5 bar and 3 bar.

Preferably, the piloting means 3a, 3b comprise two pilot valves, i.e. one for each aseptic valve 2a, 2b.

Figure 2:
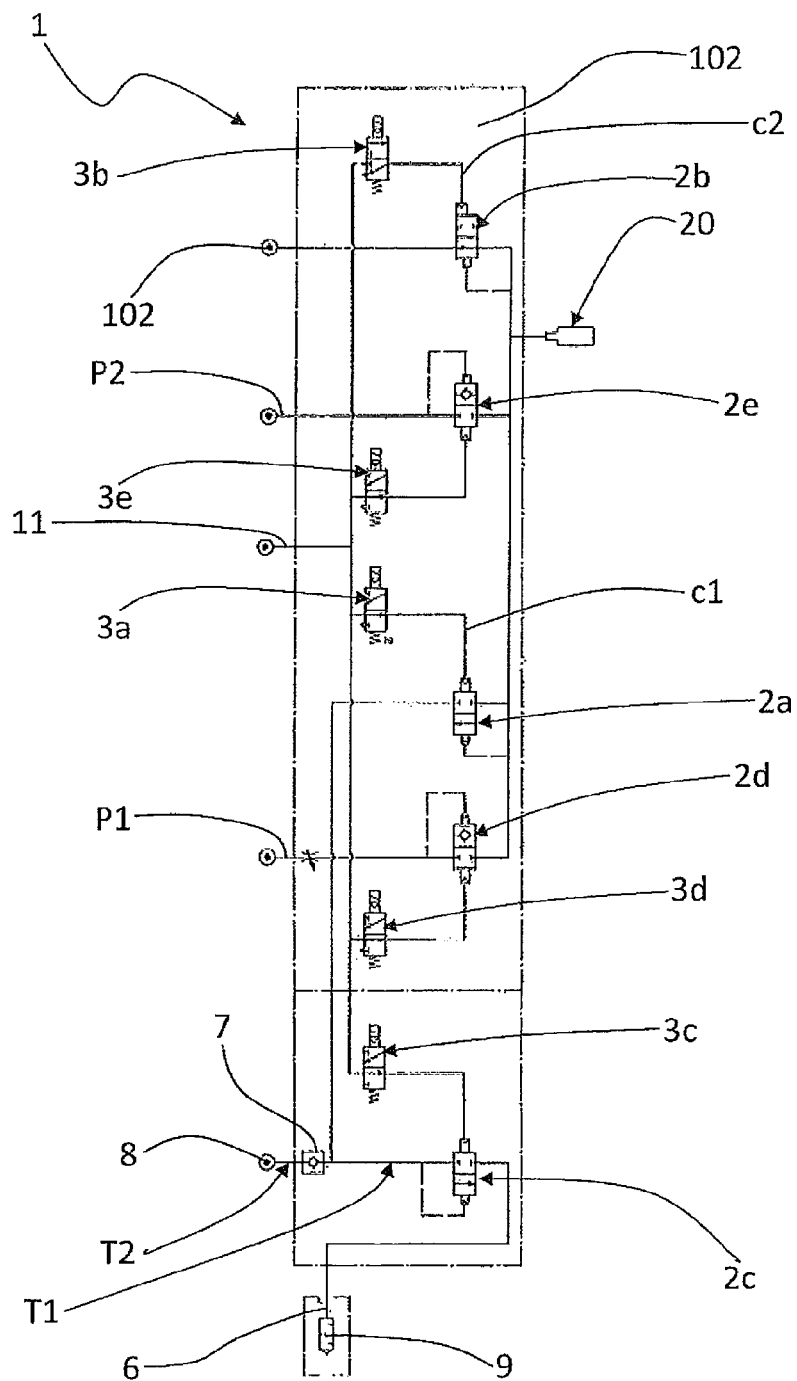
FIG. 2 illustrates the pneumatic diagram of an alternative embodiment of the air exhaust circuit of FIG. 1.

In an alternative embodiment, illustrated in FIG. 2, the air exhaust circuit comprises a third aseptic valve 2c and a check valve 7, which are respectively arranged along a first pathway T1 which goes from the first valve 2a towards the external exhaust line 6 and along a second pathway T2 which goes from the first valve 2a towards a recovery circuit 8. The air thus recovered can be used, for example, for pre-blowing.

In this embodiment there is also an additional pilot valve 3c, belonging to the piloting means, which is configured so as to pilot the third valve 2c.

In both embodiments the piloting means are supplied by a dedicated supply line 11, preferably with pressurised air at about 6 bar.

With reference to the figures, the number 1 indicates an air supply and exhaust system comprising the exhaust circuit described above.

The air supply and exhaust system 1 can be used to blow air into the parison 20 and, subsequently, to evacuate it from the parison or moulded container 20.

The air supply and exhaust system 1 further comprises a fourth aseptic valve 2d and a fifth aseptic valve 2e. The fourth valve 2d is configured so as to establish a selective communication between a supply line of pre-blown air P1 and the inside of the parison 20. In particular, the supply line of pre-blown air P1 supplies pressurised air at up to a maximum pressure of about 16 bar.

The fifth valve 2e is configured so as to establish a selective communication between a line for supplying blown air P2 and the inside of the parison 20. In particular, the line for supplying blown air P2 supplies pressurised air at up to a maximum pressure of about 40 bar.

Two additional pilot valves 3d, 3e are provided to control, respectively, the fourth valve 2d and the fifth valve 2e.

Each of the aseptic valves 2a, 2b, 2c, 2d, 2e mentioned is a valve provided with an element of separation between the supply circuit and the actuation circuit. Preferably, each aseptic valve 2a, 2b, 2c, 2d, 2e is a membrane valve. For example, valves of the type indicated in FIG. 4 of the document WO2011/042184 can be used.

Figure 1:
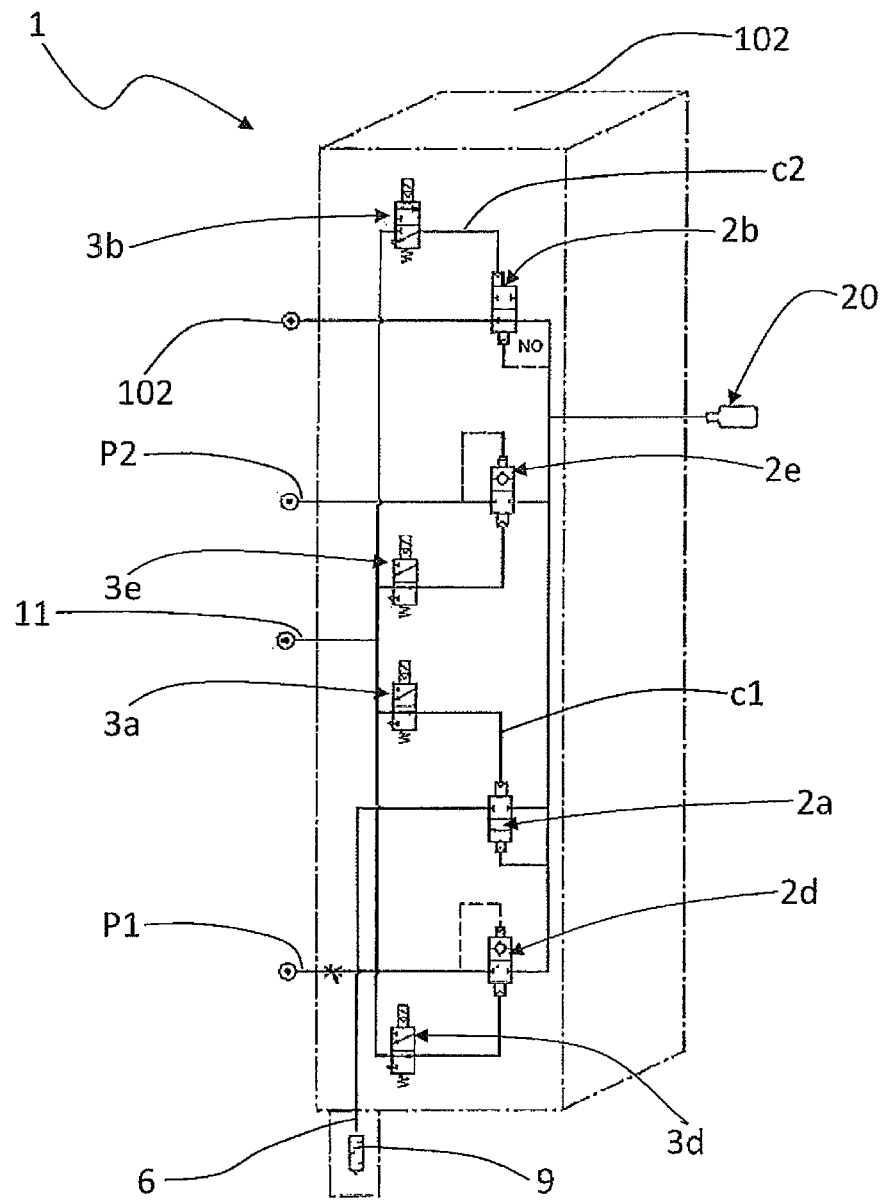
FIG. 1 illustrates the pneumatic diagram of an air exhaust and supply circuit according to the present invention.

The process of moulding a container under aseptic conditions starting from a parison made of plastic material, according to the present invention, is described below, with particular reference to FIG. 1.

Air is initially injected into the parison 20, placed in the corresponding mould 10, at a maximum pressure of 16 bar. This step, called pre-blowing, is carried out by opening the fourth valve 2d, which establishes fluid communication between the inside of the parison 20 and the supply line of pre-blown air P1.

The fifth valve 2e is instead kept closed.

Then follows the actual blowing step, during which air is injected into the parison 20 at the maximum pressure of 40 bar. This is achieved by closing the fourth valve 2d and opening the fifth valve 2e in such a way that the parison 20 enters into fluid communication with the line for supplying blown air P2.

At the end of the blowing step, the container 20 is moulded.

In a first exhaust step, the air is evacuated toward the outside of the contamination-controlled environment 102 until the air pressure inside the container 20 reaches the predetermined value.

This step is performed by opening the first valve 2a which establishes fluid communication between the inside of the parison or container 20 and the external exhaust line 6, and keeping the second valve 2b closed.

In a second exhaust step, the air is evacuated towards the contamination-controlled environment 102.

This step is performed by closing the first valve 2a and opening the second valve 2b.

It should be noted that during the pre-blowing and blowing steps, the second valve 2b is kept closed so as not to compromise the pressure balance inside the contamination-controlled environment 102.

When the air pressure exceeds the predetermined value, the first valve 2a, which is normally closed, is opened so as to enable air to be discharged from inside the parison or container 20 toward the external exhaust line 6. The second valve 2b, in the meanwhile, is kept closed. Practically speaking, air is discharged through the first valve 2a toward the outside of the contamination-controlled environment 102 so as to go from a high pressure (maximum of 40 bar) to the predetermined value.

When the pressure has fallen below the predetermined value, the first valve 2a returns into a closed condition. It should be noted that the closure of the first valve 2a takes place while the flow of air goes from inside the container 20 toward the external exhaust line 6. Practically speaking, when the first valve 2a is open, there is always a flow of air that goes from the inside of the container 20 toward the outside so as to rule out the possibility that any contaminants present in the exhaust circuit (for example in the damper 9) can migrate toward the inside, i.e. toward the contamination-controlled environment 102.

The second valve 2b, on the other hand, is opened at the same time as the first valve 2a is closed so that the air can be completely discharged from the inside of the container 20, which is sterile, toward the contamination-controlled environment 102. Practically speaking, air is discharged from the second valve 2b at the predetermined value until reaching a pressure equilibrium with the contamination-controlled environment 102.

From the description made, the features of the air exhaust circuit, air supply and exhaust system and aseptic moulding process using said circuit and said system according to the present invention are clearly apparent, as are the advantages thereof.

In particular, thanks to the creation of two different air exhaust pathways, obtained through two valves (first valve and second valve) actuated in an alternating manner, it is possible to obtain an exhaust circuit usable in aseptic moulding processes and capable of complying with safety and accident prevention regulations.

In fact, the closure of the first valve during the evacuation of air from the container prevents the entry of contaminants into the parison/container. Moreover, the discharge of air towards the contamination-controlled environment is completed by means of the second valve, and thus safety and accident prevention regulations are complied with.

Furthermore, splitting the air exhaust line into two ensures aseptic conditions and avoids penalizing the functioning of the isolation device. In fact, it would not be possible to continuously exhaust air in the contamination-controlled environment without compromising the functioning of the isolation device.

The invention claimed is:

1. Apparatus (100) for moulding containers in aseptic conditions starting from parisons made of plastic material, said apparatus (100) comprising:
   i) a contamination-controlled environment (102);
   ii) a mould (10) located in the contamination-controlled environment (102);
   iii) supply and exhaust system of air for insufflating and evacuating blown air from a parison or a moulded container (20) in a contamination-controlled environment (102), said supply and exhaust system of air in turn comprising:
      an exhaust circuit in the contamination-controlled environment (102) of the blown air from a parison or a moulded container (20), said circuit comprising:
         a first aseptic valve (2a) configured such as to establish a selective communication between the inside of the parison or the moulded container (20) and an exhaust line (6) external of said contamination-controlled environment (102);
         a second aseptic valve (2b) configured such as to establish a selective communication between the inside of the parison or the moulded container (20) and the contamination-controlled environment (102);
         piloting means (3a, 3b) of said first and said second aseptic valve (2a, 2b), configured such that the discharge of the air present in the parison or in the moulded container (20) occurs, respectively, towards said contamination-controlled environment (102) through the second valve (2b) while the air pressure in the parison or in the moulded container (20) is maintained below a predetermined value, and externally of the contamination-controlled environment (102) through the first valve (2a) while the air pressure is maintained above said predetermined value; said predetermined value being comprised between 0.5 bar and 3 bar; said first valve (2a) being normally closed and receiving, during a first exhaust phase, an opening command (C1) from the piloting means (3a) in response to detection of an air pressure in the parison or in the moulded container (20) which is greater than said predetermined value; said second valve (2b) being normally open and receiving a closing command (C2) from the piloting means (3b) in response to detection of an air pressure in the parison or in the moulded container (20) which is above said predetermined value;
      a fourth aseptic valve (2d) configured such as to establish a selective communication between a supply line of pre-blown air (P1) and the inside of the parison (20);
      a fifth aseptic valve (2e) configured such as to establish a selective communication between a supply line of blown air (P2) and the inside of the parison (20).

2. Process of moulding a container in aseptic conditions starting from a parison (20) made of plastic material, comprising the steps of:
   placing the parison (20) in a mould (10) located in a contamination-controlled environment (102);
   injecting air at the maximum pressure of about 16 bar into the parison (20);

injecting air at the maximum pressure of about 40 bar into the parison (20) in such a way as to obtain said container, characterised in that it further comprises the steps of:

discharging the air from the parison or from the container (20) externally of the contamination-controlled environment (102) until the air pressure inside the container (20) reaches a predetermined value comprised between 0.5 bar and 3 bar, said step being performed by opening a first aseptic valve (2a) which establishes a fluid communication between the inside of the container (20) and an exhaust line (6) external of said contamination-controlled environment (102), and by maintaining closed a second aseptic valve (2b) arranged between the inside of the container (20) and the contamination-controlled environment (102);

completing the discharge of the air from the container (20) towards the contamination-controlled environment (102) by closing said first aseptic valve (2a) and by opening said second aseptic valve (2b).

3. Moulding process according to claim 2, wherein the first aseptic valve (2a) is closed while the air is still flowing from the inside of the container (20) towards the external exhaust line (6).

4. Moulding process according to claim 2, wherein said second valve (2b) is kept closed during both injecting steps of air into the parison (20).

5. Moulding process according to claim 3, wherein said second valve (2b) is kept closed during both injecting steps of air into the parison (20).

\* \* \* \* \*